(No Model.) 3 Sheets—Sheet 1.

A. W. JOHNSON.
BUTTON HOLE ATTACHMENT FOR SEWING MACHINES.

No. 389,573. Patented Sept. 18, 1888.

Witnesses
J. H. Shumway
Fred C. Earle

Albert W. Johnson
Inventor
By atty (No Model.) 3 Sheets—Sheet 2.
A. W. JOHNSON.
BUTTON HOLE ATTACHMENT FOR SEWING MACHINES.
No. 389,573. Patented Sept. 18, 1888.
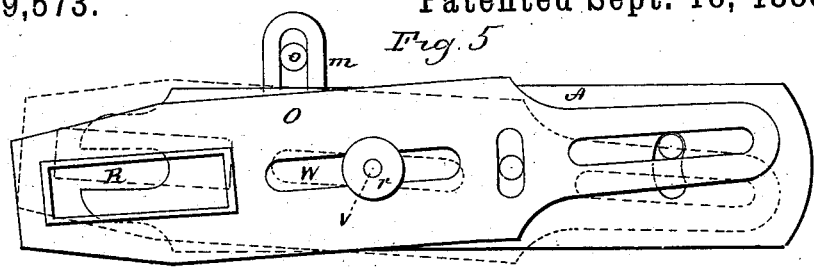
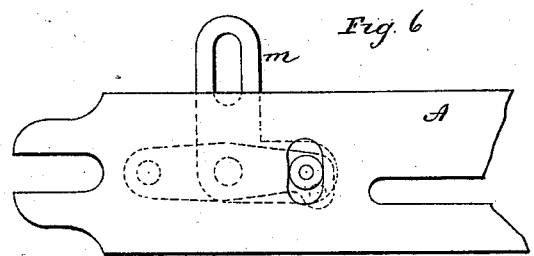
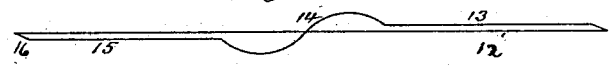
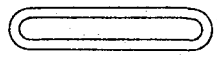
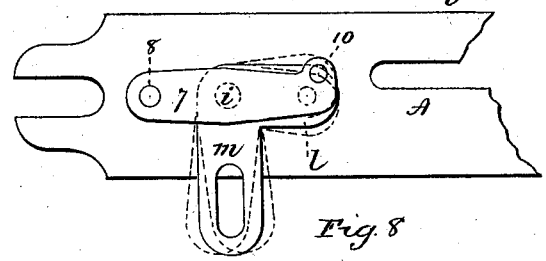
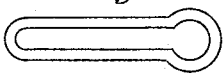
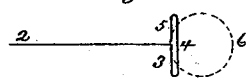
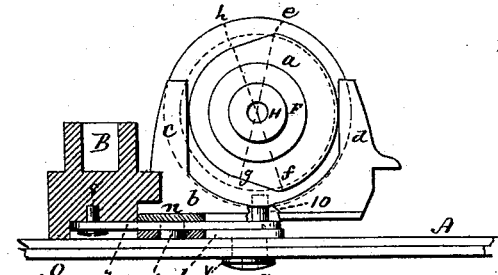
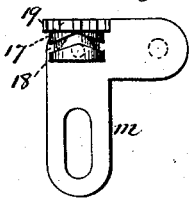
Witnesses
J. H. Shumway
Fred C. Earle
Albert W. Johnson
Inventor
By atty
N. PETERS. Photo-Lithographer, Washington, D. C.

(No Model.)  3 Sheets—Sheet 3.

A. W. JOHNSON.
BUTTON HOLE ATTACHMENT FOR SEWING MACHINES.

No. 389,573.  Patented Sept. 18, 1888.

Witnesses
J. H. Shumway
Fred C. Earle

Albert W. Johnson
By atty.  Inventor

UNITED STATES PATENT OFFICE.

ALBERT W. JOHNSON, OF NEW HAVEN, ASSIGNOR TO THE PEERLESS BUTTON HOLE ATTACHMENT COMPANY, OF TYLER CITY, CONNECTICUT.

BUTTON-HOLE ATTACHMENT FOR SEWING-MACHINES.

SPECIFICATION forming part of Letters Patent No. 389,573, dated September 18, 1888.

Application filed July 18, 1887. Serial No. 244,577. (No model.)

*To all whom it may concern:*

Be it known that I, ALBERT W. JOHNSON, of New Haven, in the county of New Haven and State of Connecticut, have invented a new Improvement in Button-Hole Attachments for Sewing-Machines; and I do hereby declare the following, when taken in connection with accompanying drawings and the letters of reference marked thereon, to be a full, clear, and exact description of the same, and which said drawings constitute part of this specification, and represent, in—

Figure 1:
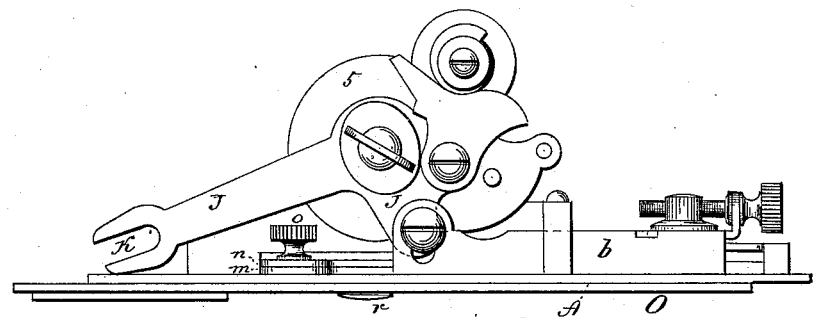
Figure 2:
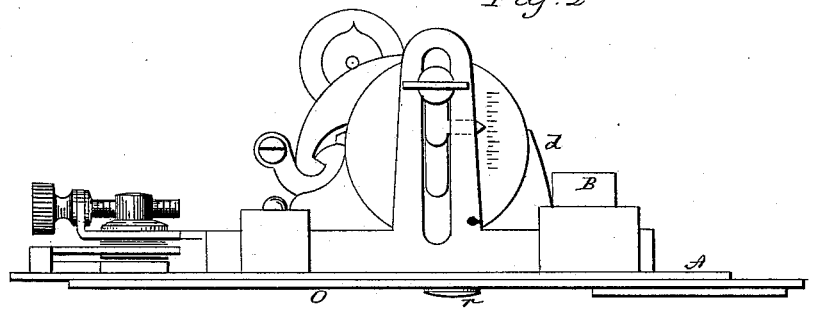
Figure 3:
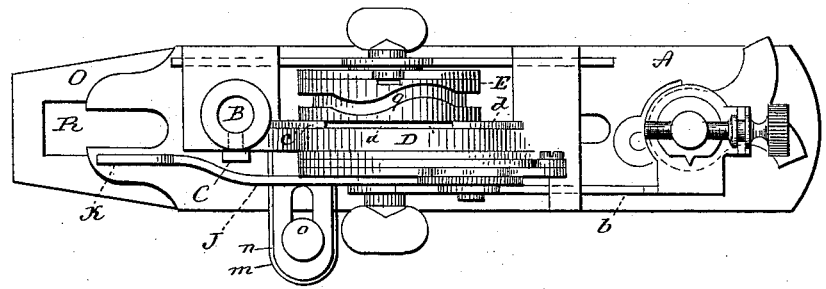
Figure 4:
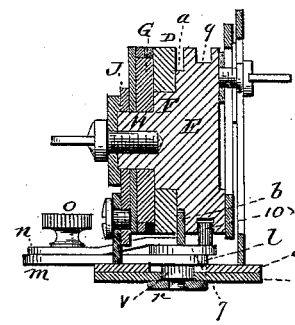
Figure 17:
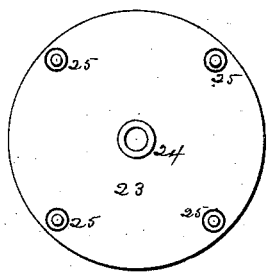
Figure 18:
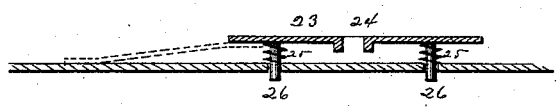
Figure 19:

Figure 1, a side view of the attachment, looking from the right; Fig. 2, a side view looking from the left; Fig. 3, a top view of the same, the parts being in the position seen in Fig. 1; Fig. 4, a transverse vertical section through the feed-disk; Fig. 5, an under side view of the attachment; Fig. 6, an under side view of the base, the work-holder removed; Fig. 7, a top view of the base, showing the lever through which the compound transverse movement of the work-holder is produced; Fig. 8, a partial longitudinal section illustrating the mechanism for imparting the compound transverse movement to the work-holder. Figs. 9 and 10 represent the two classes of buttonholes; Fig. 11, a diagram illustrating the compound transverse movement of the work-holder required to produce the button-hole Fig. 10; Fig. 12, a diagram illustrating the modification in the cam-groove of the feed-disk; Figs. 13, 14, 15, and 16, modifications in the mechanism for imparting the said compound transverse movement to the work-holder; Fig. 17, an under side view of the work-plate; Fig. 18, a side view of the same; Fig. 19, a modification in the work-plate.

This invention relates to an improvement in that class of button-hole attachments for sewing-machines which are adapted to be applied to the presser-foot bar of the machine, and which are actuated through a lever hung upon the attachment and extending into connection with the needle-bar, so that the up-and-down reciprocating movement of the needle-bar imparts vibratory movement to the said lever, and this vibratory movement of the said lever imparts the required vibratory movement of the respective parts of the attachment, and is an improvement upon the attachment for which I filed an application for Letters Patent of the United States December 13, 1886, Serial No. 221,405, the present invention relating more particularly to the feeding mechanism.

A represents the base, upon the upper side of which is a socket, B, adapted for attachment to the presser-foot bar, and to which it may be secured by a screw, C, or otherwise, and so that the attachment may partake of the up-and-down movement of the presser-foot bar.

On the base is an upright, D, (see Figs. 3 and 4,) which is in the form of a flat plate, the plane of which is longitudinally of the attachment. On one side of this upright is a disk, E, the hub F of which extends through the upright. The disk, however, takes a bearing upon its side of the upright. Upon the opposite side of the upright is a concentric disk, G, made fast to the hub F of the disk E, and so that the disk G takes a bearing against its side of the upright, but so as to permit the free revolution of the disks E and G. Upon the extension H of the hub F the actuating-lever J is hung loosely. It extends from the hub and terminates at its free end in a fork, K, (see Fig. 1,) which is adapted to engage the needle-bar in the usual manner for this class of sewing-machine attachments, and so that the up-and-down reciprocating movement of the needle-bar will impart corresponding movement to the lever J.

Mechanism is provided between the lever J and the disk G by which an intermittent rotation is imparted to the said disk G to give the longitudinal feed-movement to the cloth-holder. The particular mechanism between the feed-disk G and the lever J shown in this application is fully described in an application filed July 18, 1887, Serial No. 244,576, and a different mechanism described in the application before referred to; but such mechanism constituting no part of the present application, its description in this specification is unnecessary, further than the statement that the lever J imparts the step-by-step longitudinal feed through the disk G.

Beneath the base the work-holding clamp is arranged. This consists of a plate, O, (see Figs. 4 and 5,) hung upon the under side of the base, and so as to be free for longitudinal and transverse movement, as hereinafter described. The plate O is constructed with an opening, R, (see Figs. 3 and 5,) at the needle end, this opening being somewhat larger than the maximum size of button-hole to be wrought. Around the edge of the opening is a roughened or equivalent surface adapted to engage the fabric in which the button-hole is to be wrought. The plate O being hung to the base and the base to the presser-foot, when the presser-foot is raised the plate O will rise with it, so as to leave a space between it and the cloth-plate for the introduction of the work and the proper presentation of the button-hole to the plate O, and so that when the presser-foot is dropped in the usual manner the opening R in the plate O will surround the button-hole and hold it in its proper relation thereto.

The plate O receives a lateral vibratory movement to permit the needle to first descend through the work upon the inner edge of the button-hole, and then in the next stitch to take onto the material outside the button-hole, and so continuing. It also receives an advance movement or feed for each stitch until the end of the button-hole is reached. Then the holder is thrown to the opposite side, and returned by the step-by-step feed to stitch the opposite side of the button-hole. The mechanism which I have illustrated in the accompanying drawings for imparting this transverse vibratory movement to the button-hole is fully described in the two applications hereinbefore referred to, and therefore does not require to be specifically described in this application, further than to state that under the action of the lever J a vibratory movement is imparted to the work-holder O, as indicated in broken lines, Fig. 5, so as to move the work to cause the needle to pass first through the hole and next into the fabric.

The plate O is constructed with a longitudinal slot, W, which works upon a stud, V, projecting downwardly through the base A, and so that it may vibrate thereon in a horizontal plane, but at the same time move longitudinally back and forth.

In working button-holes as in the two applications before referred to, the work progresses along one side of the button-hole and returns upon the opposite side, as indicated in Fig. 9. In the transverse movement of the holder at each end the end of the button-hole is wrought. In these cases the button-hole is simply a straight slit from end to end. It is, however, often desirable to make the button-hole with an eyelet at one end, as seen in Fig. 10.

The object of my present invention is to adapt a button-hole attachment to the formation of the eyelet end of the button-hole.

To throw the work transversely as the stitching approaches one end of the button-hole, and so that the stitching may continue around the end and then return upon the opposite side, as seen in Fig. 11, I illustrate the same mechanism as that shown in the two applications before referred to. It consists of a cam, $a$, formed upon the hub F or made a part of the disk E, as seen in Figs. 4 and 8, and guided on the base is a slide, $b$, having two arms, $c\ d$, extending upward, one each side of the cam $a$, and so that the cam works between the two arms as a fork; hence, as the cam revolves with the feed and crank disk, it will impart a reciprocating movement to the slide $b$. The cam $a$ is in four divisions, as seen in Fig. 8. From the point $e$ to the point $f$ indicates one side of the button-hole, and is the greatest projection of the cam concentric with the axis. From $f$ to $g$ the cam gradually contracts, and this contracted portion occurs at one end of the button-hole. Then from $g$ to $h$ is concentric with the axis, and is of smaller diameter, and of substantially the same extent as from $e$ to $f$, corresponding to the other side of the button-hole. Then from $h$ to $e$ is a rise of the cam like the fall off from $f$ to $g$, and corresponds to the opposite end of the button-hole.

Beneath the slide $b$, upon a fulcrum, $i$, a bell-crank lever is hung, one arm, $l$, of which extends longitudinally beneath the slide $b$. The other arm, $m$, extends outward at right angles, and from the slide $b$ an arm, $n$, extends over the arm $m$. The arms $m$ and $n$ are connected by an adjustable screw-pivot, $o$, working in slots in the respective arms, so that the reciprocating movement of the slide $b$ imparted by the cam $a$, as before described, will impart a corresponding transverse vibratory movement to the arm $l$, as indicated in broken lines, Fig. 7. From the arm $l$ the stud V extends downward through the longitudinal slot W in the work-holder O, so that the transverse movement of the arm $l$ will be imparted to the work-holder to throw it from right to left and return, as indicated in Fig. 5.

Upon the lower end of the stud V a collar, $r$, is fixed as a support for the plate O. As the work approaches one end of the button-hole under the step-by-step rotative movement of the feed-disk, the cam $a$, working accordingly, brings one of its extreme points—say $f$—to one arm of the slide $b$ and the opposite point, $h$, to the other arm of the slide. Then the slide commences its reciprocating movement under the corresponding rise and fall of the cam until the opposite points $g$ and $e$ are reached, and during the movement of the slide $b$ under the rise and fall of the cam. The lever-arm $l$ is turned to one side and correspondingly throws the work-holder. Then as the rise and fall of the cam $a$ again come upon the slide it will step by step throw it to the opposite extreme and correspondingly turn the work-holder and present the button-hole for the opposite side, the stitching being made around the end by the step-by-step movement over the rise and fall of the cam, and this same movement will occur at each end of the button-hole. In this work the hole produced will be, as seen in Fig. 9, alike at both ends. The step-by-step feed for each stitch continues while the change is being made from one side to the other of the button-hole, so that while the turn is being made the feed will be the combined advance and transverse movement, which results in a rounded end to the button-hole, as seen in Fig. 9. To produce the eyelet-shaped end for the button-hole, as seen in Fig. 10, it is necessary to move the work-holder when at that end of the button-hole under a compound transverse movement—that is to say, as seen in Fig. 11. The line 2 indicates the central line of the button-hole. As the work arrives at the eyelet end an outward transverse movement must be given—say as indicated by the line 3—then a transverse return movement, and outward upon the opposite side to the same extent as the line 3, and as indicated by the line 4, then to return to the center, as indicated by the line 5. This transverse movement, combined with the advance feed, will produce a circular path for the work, as indicated by the broken line 6, Fig. 11, and so that the stitches made during this movement will be in the form of a circle and produce the eyelet end of the hole. To impart this compound transverse movement to the work-holder, a lever, 7, is introduced longitudinally between the lever $l\,m$ and the slide above, as seen in Figs. 4, 7, and 8. This lever 7 is hung upon a pivot, 8, distant from the pivot $i$, on which the lever $l\,m$ is hung, and toward the needle, the lever 7 extending to the opposite side of the said pivot $i$, as seen in Figs. 7 and 8. The pivot $i$ is upon the lever 7, or made as a part of it, so that the lever $l\,m$ is practically hung upon the lever 7, the lever 7 being adapted to swing in a horizontal plane.

In the periphery of the disk E is a cam-shaped groove, 9. (See Figs. 3 and 4.) The groove is parallel with the plane of the disk, except for a portion on one side the disk, as seen in Fig. 3. This portion is of S shape. Starting from the groove at one end, it is curved outward and returns into the plane of the circumferential groove midway of the length of the S-shaped portion. From that midway portion the groove is curved outward in the opposite direction, and returns again into the plane of the circumferential groove, as seen in Fig. 3, and so that the cam-shaped portion of the groove is alike each side of its central point, but reversely curved. Into this groove, from the lever 7, a stud, 10, extends, (see Figs. 4 and 8,) and so that the lever 10 is under the control of the cam shaped groove 9. The S or curved shaped portion of the groove occurs while the work is passing the eyelet end of the button-hole. The result of this cam upon the lever 7 is to impart to that lever an outward movement in one direction, thence returning and passing outward to the other side, and then return again to the central position, when the stud will follow the circumferential or straight portion of the groove. Under this movement of the lever 7 the pivot $i$, on which the lever $l\,m$ turns, is moved corresponding to the lever 7, and because of such movement of the lever $l\,m$ the work-holder, being hung upon said lever, is moved accordingly, and the work carried by the work-holder will also be moved corresponding to the movement imparted by the cam-shaped groove 9, and this movement is such as indicated in Fig. 11, which, combined with the advance intermittent feed movement imparted to the work-holder, produces a circular path of stitching and forms the eyelet end of the button-hole. During the rotation of the disk, in which is the cam-groove 9, the lever 7 is held in its central position by the groove from one end of the curved portion of the groove around the disk to the opposite end of the curved portion, so that during this part of the movement of the disk the pivot $i$ is stationary, and as if it were a stationary part of the base. The connection between the slide $b$ and the arm $m$ of the lever $l\,m$ is adjustable, so as to make the point of connection nearer to or farther from the pivot $i$, on which the said lever $l\,m$ is hung, and so that the movement imparted to the work-holder by the cam $a$ may be increased by bringing the point of connection between the slide and the arm $m$ nearer the pivot $i$, or vice versa. This is a desirable adjustment to adapt the attachment to various widths of button-hole.

In case a standard size of button-hole only is desired to be made, and consequently no such adjustment necessary, then the cam-shaped groove 9 may produce the turn at each end by making the groove 9 in the shape indicated in Fig. 12, the line 12 representing the central line of the button-hole, the irregular line denoting the central line of the cam-groove. That portion 13 of the groove-line on one side of the central line indicates one side of the button-hole, the curved portion 14 indicates the compound transverse movement before described, the straight portion 15 of the line on the opposite side of the central line, 12, indicates the other side of the button-hole, and the oblique termination 16 of the line 15 indicates the return to intersect the line 13, and is the opposite end of the button-hole.

The movement which I have described as imparted to the pivot $i$, on which the lever $l\,m$ is hung, while preferably produced by the cam-shaped groove, as I have described, may be otherwise produced—say as represented in Figs. 13 and 14—by forming on the periphery of the disk E a series of gear-teeth at a point corresponding to the eyelet end of the button-hole and arranging a cam, 17, having a groove, 18, of the requisite shape, into which the pivot $i$ extends, as seen in Fig. 13, the cam being provided with a pinion, 19, corresponding to the teeth on the disk E, so that at the proper time the disk E will impart a full revolution to the cam 18, and that full revolution will produce the compound transverse movement of the pivot indicated by the lines 3 4 5, Fig.

Figure 15:
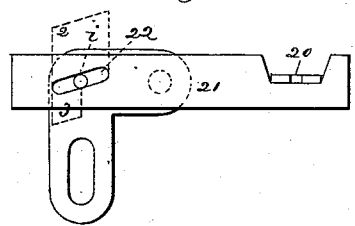
Figure 16:

11, and before fully described. Again, the movement of the pivot may be produced by a longitudinal slide, as seen in Figs. 15 and 16, with a pinion like 19, carrying a crank-pin adapted to work into a vertical slot, 20, extending up from the said slide 21, and the slide constructed with a diagonal groove, 22, into which the pivot *i* extends, and so that the full reciprocating movement imparted to the slide 21 by the said crank-pin will, through the diagonal slot 22, impart the compound transverse movement to the pivot *i* indicated by lines 3 4 5 of Fig. 11.)

In operating upon the button-hole it is necessary to have a supporting work-plate beneath, which will yield to varying thicknesses and irregularities of material and practically form a universal adjustment with relation to the work-holder. To accomplish this object I construct an auxiliary work-plate, 23, (see Figs. 17 and 18,) which may be circular or any suitable shape, having the needle-hole 24, through which the needle will work. This plate is supported upon a spring or springs around its outer edge—say as by three or more helical springs, 25, arranged equidistant between the work-plate 23 and suitable bearings below—the plate being prevented from rotation and held in its proper relation to the needle by vertical guide-pins 26, which extend into corresponding holes below, but so as to allow the plate to work freely up and down.

The springs may be around the pins 26, as represented, and so that each will yield as pressure may come upon it and permit the plate to tip or rock, so as to adapt itself to the work being produced.

Instead of making several springs, as I have described, the plate may be arranged upon a single spring of large diameter, as seen in Fig. 19, adapted to yield at all points, and so as to permit the required universal movement of the work-plate.

Instead of making the guide for the work-plate in the form of pins working through holes below, and whereby the rotation of the work-plate is prevented, other guiding devices for this purpose may be substituted therefor, such, for illustration, as indicated in broken lines, Fig. 18, in the form of a thin elastic metal arm, one end fixed to the work-plate 23, and the other end fixed to the plate below at a distant point. I therefore do not wish to be understood as limiting the invention to any particular device for vertically guiding the plate, it only being essential that there shall be a vertical guide which will support the plate in its proper relation to the needle-hole and prevent its rotation; but in any case the support for the plate to resist its rotation must be such as to leave the plate free for the universal self adjustment hereinbefore mentioned, so that the plate may tilt in all directions; but I do not wish to to be understood as claiming broadly a work-plate hung so as to rise and fall as upon a hinge, as such, I am aware, is not new; but such hinge arrangement does not permit the required universal movement, and which is fully permitted under this construction.

The feeding device which I have described whereby the eyelet-shaped button-hole is produced may be employed with other mechanism than that which I have described for imparting both the vibratory and step-by-step feed movement to the work-holder. I therefore do not wish to be understood as limiting this part of my invention to any particular mechanism for producing the step-by-step and vibratory feed of the work-holder; nor do I wish to be understood as limiting my invention to the particular mechanism for producing the lateral or transverse movement combined with the step-by-step advance feed, as it will be evident from the modifications shown that various mechanisms may be employed for this purpose; but What I do claim is—

1. In a button-hole attachment for sewing-machines, the combination of a work-holder, a lever adapted to engage the needle-bar of the sewing-machine and receive vibratory movement therefrom, a disk, and mechanism between it and said lever whereby said disk receives intermittent rotation, with mechanism, substantially such as described, between said disk and work-holder, whereby said work-holder receives an intermittent advance and vibratory movement, the said work-holder hung upon a pivot as its center of vibration, the said pivot made transversely movable, and a cam in connection with said disk and so as to partake of its rotation, the said cam in engagement with said pivot, the active portion of the cam corresponding in position to the eyelet end of the button hole, and the said active portion of the cam of S shape, substantially as specified, and whereby under the rotation of said disk a transverse movement is imparted to said pivot, and through it to the work-holder carried by said pivot, first to one side of the central line, then returning it across to the opposite side, and finally returning it upon that side to the center.

2. In a button-hole attachment for sewing-machines, the combination of a work-holder adapted to receive an intermittent advance and vibratory movement, a pivot forming the center of vibration for said work-holder, a lever adapted to engage the needle-bar of the sewing-machine and receive vibration therefrom, and a disk, with mechanism, substantially such as described, between it and said lever, whereby intermittent rotation is imparted to said disk, said disk constructed with a circumferential groove having an S-shaped bend therein, a lever between said disk and work-holder, the said lever carrying the said pivot upon which the said work-holder is hung as a center of vibration, the said lever provided with an extension therefrom adapted to work in the groove of the said disk, substantially as and for the purpose described.

3. In a button-hole attachment for sewing-machines, the combination therewith of a work-plate, 23, constructed with a needle-hole, 24, and provided with vertical guides adapted to prevent the rotation of the plate, with one or more springs below said work-plate, and upon which it rests, substantially as and for the purpose described, and whereby the said plate is made universally adjustable as to the plane of its working-surface.

ALBERT W. JOHNSON.

Witnesses:
FRED C. EARLE,
JOHN E. EARLE.